O. W. DODGE.
MEANS FOR REMOVING WATER OF CONDENSATION FROM DRYING CYLINDERS.
APPLICATION FILED MAY 24, 1913. RENEWED JULY 11, 1916.
1,215,258.
Patented Feb. 6, 1917.
2 SHEETS—SHEET 2.
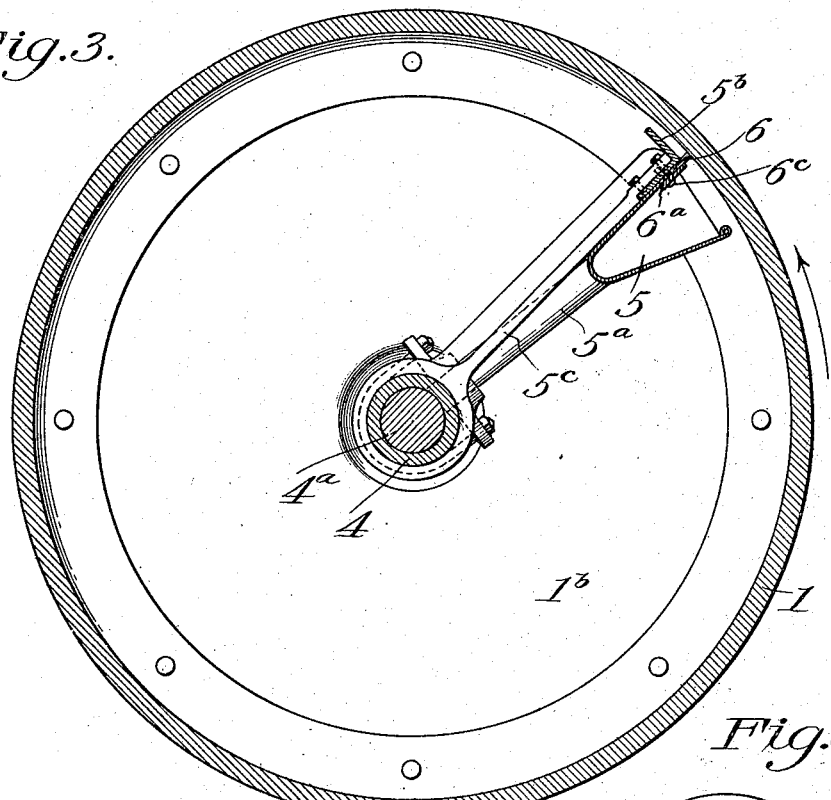
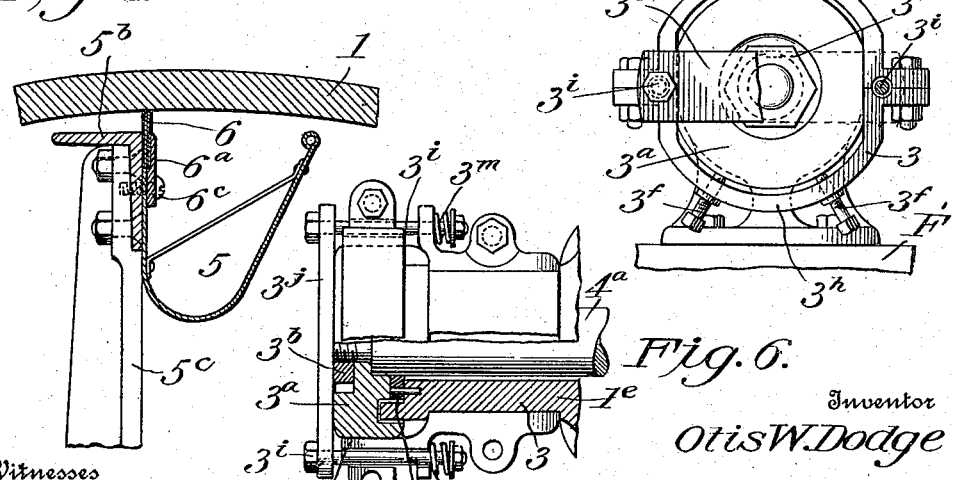

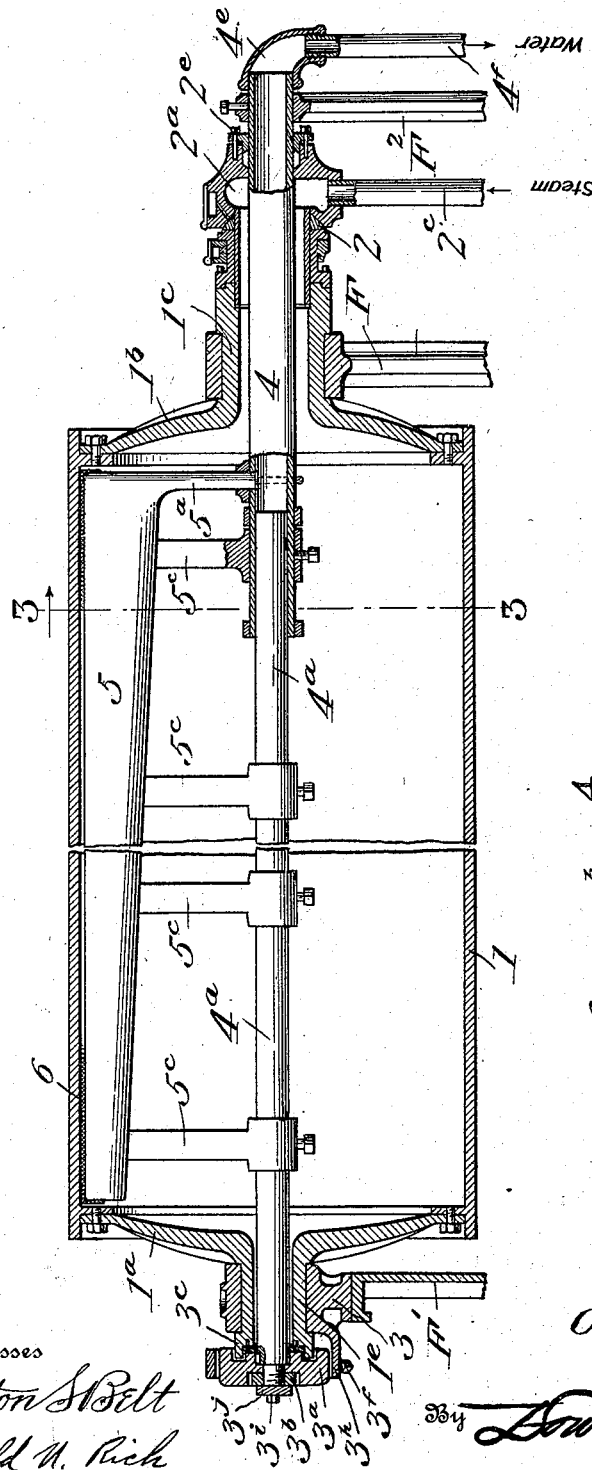

UNITED STATES PATENT OFFICE.

OTIS WM. DODGE, OF SPOKANE, WASHINGTON, ASSIGNOR OF ONE-HALF TO WALTER H. BOWES COMPANY, OF PORT CHESTER, NEW YORK, A CORPORATION OF NEW YORK.

MEANS FOR REMOVING WATER OF CONDENSATION FROM DRYING-CYLINDERS.

1,215,258.        Specification of Letters Patent.        Patented Feb. 6, 1917.

Application filed May 24, 1913, Serial No. 769,762. Renewed July 11, 1916. Serial No. 108,724.

*To all whom it may concern:*

Be it known that I, OTIS W. DODGE, of Spokane, in the county of Spokane and State of Washington, have invented certain new and useful Improvements in Means for Removing Water of Condensation from Drying-Cylinders; and I hereby declare that the following is a full, clear, and exact description thereof, reference being had to the accompanying drawings, which form part of this specification.

This invention is a novel improvement in means for removing water of condensation from steam heated cylinders, and is particularly designed for use in connection with the drying cylinders of paper making machines; and its object is to enable all water of condensation to be removed from the cylinders so that the interior surfaces of the cylinders can be kept dry, thereby facilitating the heating thereof and enabling each cylinder to be kept at a uniform temperature throughout its entire peripheral surface; and also enabling such cylinders to be run at much greater peripheral speeds than has heretofore been practicable, owing to the fact that at above a certain speed water of condensation will adhere to the inner wall of the cylinder and rotate with the cylinders by centrifugal force; and coat the interior of the cylinders with a film of water thereby impairing their efficiency and necessitating the use of a great amount of steam for heating them to the proper temperature.

With my invention all the water of condensation is removed as fast as it is precipitated and the invention acts most efficiently when the cylinder is rotated at high speed.

The accompanying drawings illustrate an apparatus, applicable to drying cylinders of the character referred to, embodying one practical form of my invention; and an explanation of the construction and mode of operation of such apparatus will impart a clear understanding of the invention and enable those familiar with the art to readily utilize the same in connection with various kinds and sizes of drying, or steam heated, cylinders.

In the drawings—

Figure 1 represents a longitudinal section through a steam heated cylinder equipped with my improved novel apparatus for removing water of condensation therefrom.

Fig. 2 is a detail top plan view of the water trap.

Fig. 3 is an enlarged vertical transverse section on line 3—3, Fig. 1.

Fig. 4 is an enlarged transverse section on line 4—4, Fig. 2.

Figs. 5 and 6 are detail views of the adjustable bearing or support for the trap.

The cylinder may be of any desired construction; as shown it is composed of a cylindric shell 1 and heads $1^a$, $1^b$ closely fitted thereto and closing the ends thereof; each head may be provided with a hollow trunnion. The trunnion $1^c$ of the head $1^b$ is journaled in a support F of any suitable kind and extends through such bearing, and its outer end is connected by a steam tight fitting or joint 2, of ordinary construction, with a hollow collar $2^a$, which in turn is connected by a pipe $2^c$ with a steam supply, of any suitable kind.

The trunnion $1^e$ of the head $1^a$ is journaled in a bearing 3 hereinafter referred to, which is mounted on a support F′ of any suitable construction.

Through the collar $2^a$, steam fitting 2, and trunnion $1^c$ extends a drain pipe 4 which supports the water trap in the cylinder and discharges water therefrom as hereinafter explained. The collar $2^a$ has a packing or gland $2^e$ at its outer end forming a steam tight joint around the pipe 4 so that steam cannot escape from the cylinder around the pipe 4. I prefer to attach a shaft $4^a$ to the inner end of pipe 4 and this shaft $4^a$ extends through the trunnion $1^e$ of head $1^a$, and is supported in a casting $3^a$ which is supported on the bearing 3 and may be secured by a nut $3^b$ screwed on the outer end of the shaft $4^a$, a bearing plate $3^c$ is placed around the pipe and between the cap and any suitable devices may be used to make a steam tight joint between the shaft $4^a$ and the trunnion $1^e$.

The casting $3^a$ may be adjustably supported on bearing 3 by means of bolts $3^f$ tapped through a flange $3^h$ on the end of the bearing 3 as shown, and thus raise and lower the bearing so as to enable the adjacent end of the shaft $4^a$ to be adjusted laterally in the trunnion $1^e$. The shaft $4^a$ is preferably supported on the bearing 3 and the relative positions of the shaft $4^a$ and the trunnion $1^e$ will not be disturbed by the adjustment of the bearing 3.

As shown in the drawings a bar $3^j$ extends across the end of the shaft and casting 3ª and is adjustably secured by bolts 3ⁱ to the bearing 3. Springs 3ᵐ being strung on the bolts between the nuts and bearing so as to hold the plate yieldingly thereagainst. This construction would take up any end thrust or play of the cylinder relative to the shaft 4ª and assists in keeping the trap, hereinafter referred to, properly positioned longitudinally of the cylinder.

The shaft 4ª may be keyed or pinned to the casting 3ª so that it cannot turn relatively thereto, and the casting 3ª may have a vertical sliding fit in the flange as indicated in Fig. 5 so that it cannot rotate. The invention is not restricted to the particular means shown for supporting the shaft 3ª in the bearing 3; nor to the means shown for producing a tight joint between the shaft and trunnion 1ᵉ; nor to the means for preventing relative endwise movement of the cylinder and shaft.

The end of the pipe 4 extending through the collar 2ª may be supported on a stud F², and it is connected by an elbow 4ᵉ to a drain 4ᶠ through which any water in pipe 4 escapes in the usual manner.

Within the cylinder 1 and extending longitudinally thereof, and preferably located at a point about 45° above the axis of the cylinder, is a water trap; which as shown preferably consists of a trough-shaped member 5 extending longitudinally, and preferably extending the entire length of the cylinder between the heads 1ª, 1ᵇ. This trough is preferably tapered, one end being larger than the other, so that its bottom is inclined as shown in Fig. 1, and water entering such trough will drain from the small toward the large end thereof; and its large end is connected by a pipe 5ª with the pipe 4 so that any water caught in this trap will be directed into the pipe 4 and then discharged through the pipe 4ᶠ. This trap may be made of sheet metal, and supported at its rear edge by an angle bar 5ᵇ, and this angle bar may be supported by radial arms 5ᶜ detachably attached to the pipe 4 and shaft 4ª in any suitable manner.

To the outer edge of the rear side of the trap 5 I attach a brush 6, which may be of any suitable material; preferably brass; and the brush 6 may be conveniently formed of thin brass plates, or of brass wires clamped between the bar 5ᵇ and a plate 6ª attached thereto by screws 6ᶜ as indicated in Figs. 3 and 4.

The trap is positioned in the cylinder, preferably as shown in Figs. 1 and 4, above the axis of the cylinder and at the ascending side thereof the cylinder turning toward the brush; the brush is so located that it will sweep the entire inner periphery of the cylinder as the latter revolves, and any water adhering to the walls of the cylinder would be swept off by the brush and directed into the trap 5, and would be conducted thereby to the outlet pipe 4 and discharged through the pipe 4ᶠ.

With this means the higher the speed of the cylinder the more efficient is the brush; and it is impossible for any water of condensation to collect and remain upon the interior wall of the cylinder when the latter is properly equipped with a device embodying my invention.

At high speeds water naturally tends to adhere to the wall of the cylinder under the influence of centrifugal force, and the ordinary scooping apparatus will not remove all the water of condensation; nor will scoops rotating with the cylinder remove all the water of condensation when the cylinder is rotated at very high speed; but with my device the faster the cylinder rotates the quicker will the water of condensation be removed. This invention can be applied to steam heated cylinders of all kinds, and to those now used in paper drying machines; and will enable the practical working speed of such cylinders to be greatly increased thereby effecting a corresponding increase in efficiency of the machine by enlarging its output and decreasing the cost of production; and also, because of the superior action of my invention in keeping the interior of the cylinder perfectly dry; such cylinder can be heated more uniformly and more efficiently and with less steam pressure than heretofore required, thereby further economizing and lessening the cost of production of the paper.

It will be seen that steam can be freely admitted into the cylinder to heat same; some of the steam will be condensed by contact with the walls of the cylinder; particularly where such wall contacts with a cool wet web, or material being dried. When the cylinder is rotating at high speed this water of condensation will adhere to the inner wall of the cylinder, and as the cylinder rotates, in the direction indicated by the arrow in the drawings, the water of condensation will be carried up on the wall of the cylinder until it meets brush 6 by which it will be swept off the wall and it will descend by gravity into the trap 5 and then will pass by gravity to the pipe 4 and on out through the discharge 4ᶠ.

The brush is so constructed that the trap may be adjusted to any desired angle within the cylinder and the pipe 4 and shaft 4ª may be adjusted radially in the cylinder to insure proper contact between the brush and the inner wall of the cylinder.

What I claim is:

1. Apparatus for removing water of condensation from rotary steam heated drying cylinders comprising relatively stationary means within the cylinder for brushing water of condensation from the wall thereof, and means for discharging such water from the cylinder.

2. In combination with a rotary steam heated drying cylinder, relatively fixed means adapted to brush water of condensation from the inner surface of the cylinder, and means for discharging the water from the cylinder.

3. In combination with a rotary steam heated drying cylinder, relatively fixed means extending longitudinally of the cylinder and located above the axis thereof for brushing water of condensation from the inner surface of the cylinder, and means for discharging the water.

4. In combination with a rotary steam heated drying cylinder, relatively fixed means for removing water of condensation therefrom, comprising devices within the cylinder for brushing water from the wall thereof as the cylinder rotates, and devices for discharging such water from the cylinder.

5. In combination with a rotatable steam heated cylinder, relatively stationary means extending longitudinally of and within the cylinder and located above the axis thereof adapted to brush water of condensation from the inner surface of the cylinder as the latter rotates, and means for discharging the water.

6. In combination with a rotary steam heated drying cylinder, a relatively stationary trap in the cylinder, a brush adapted to sweep water of condensation from the surface of the cylinder into such trap, and means for discharging water from the trap out of the cylinder.

7. In combination with a rotary steam heated drying cylinder, a relatively fixed trap in the cylinder located above the axis thereof, a brush adapted to sweep water of condensation from the surface of the cylinder into such trap as the cylinder rotates, and means for discharging water from the trap out of the cylinder.

8. In combination with a rotatable steam heated drying cylinder, relatively fixed means therein located above the axis thereof and adapted to sweep water of condensation from the surface of the cylinder as it rotates, and means for discharging such water from the cylinder.

9. In combination a rotatable drying cylinder, a trap within and extending longitudinally of the cylinder and located above the axis thereof, a brush attached to the rear wall of said trap and adapted to brush water from the wall of the cylinder into said trap, and means for discharging water from the trap.

10. In combination a rotatable drying cylinder, and a trap within and extending longitudinally of the cylinder; with a brush attached to the said trap adapted to brush water from the wall of the cylinder into said trap, means for discharging water from the trap; and means for adjusting the trap in the cylinder.

11. In combination a rotatable drying cylinder, a trap within and extending longitudinally of the cylinder and located above the axis thereof, a brush attached to the rear wall of said trap and adapted to brush water from the wall of the cylinder into said trap; means for discharging water from the trap; and means for adjusting the trap in the cylinder.

In testimony that I claim the foregoing as my own, I affix my signature in presence of two witnesses.

OTIS WM. DODGE.

Witnesses:
 DONALD U. RICK,
 L. E. WITHAM.

Copies of this patent may be obtained for five cents each, by addressing the "Commissioner of Patents, Washington, D. C."